United States Patent [19]

Padgaonkar

[11] Patent Number: 5,426,759
[45] Date of Patent: Jun. 20, 1995

[54] ON-CHIP/OFF-CHIP MEMORY SWITCHING USING SYSTEM CONFIGURATION BIT

[75] Inventor: Ajay J. Padgaonkar, Phoenix, Ariz.

[73] Assignee: Microchip Technology Incorporated, Chandler, Ariz.

[21] Appl. No.: 973,319

[22] Filed: Nov. 9, 1992

Related U.S. Application Data

[63] Continuation of Ser. No. 454,289, Dec. 21, 1989, abandoned.

[51] Int. Cl.6 .............................................. G06F 12/12
[52] U.S. Cl. ..................... 395/425; 364/243; 364/246; 364/246.11
[58] Field of Search .............. 364/DIG. 1, 245, 245.4, 364/243.7; 395/425

[56] References Cited

U.S. PATENT DOCUMENTS

| | | | |
|---|---|---|---|
| 4,153,933 | 5/1979 | Blume et al. | 364/200 |
| 4,308,590 | 12/1981 | Stettmaier | 364/900 |
| 4,528,625 | 7/1985 | McDonough et al. | 364/200 |
| 4,532,587 | 7/1985 | Roskell et al. | 364/200 |
| 4,542,453 | 9/1985 | Patrick et al. | 364/200 |
| 4,839,795 | 6/1989 | Iwasaki | 364/200 |
| 4,958,276 | 9/1990 | Kiuchi | 364/200 |
| 5,014,193 | 5/1991 | Garner et al. | 364/DIG. 1 |

Primary Examiner—David L. Robertson
Assistant Examiner—B. James Peikari
Attorney, Agent, or Firm—O'Connor Cavanagh

[57] ABSTRACT

A processor fabricated in a semiconductor chip has on-chip program memory and access to off-chip program memory. Switching between the on-chip memory and the off-chip memory is effected in the course of program execution, without using a pin-out of the device package in which the processor is housed or encapsulated, by writing a system configuration bit stored in a memory location shared by the on-chip and off-chip memories to a "1" or a "0" according to whether the program instruction is to be executed from the on-chip memory or the off-chip memory.

18 Claims, 1 Drawing Sheet

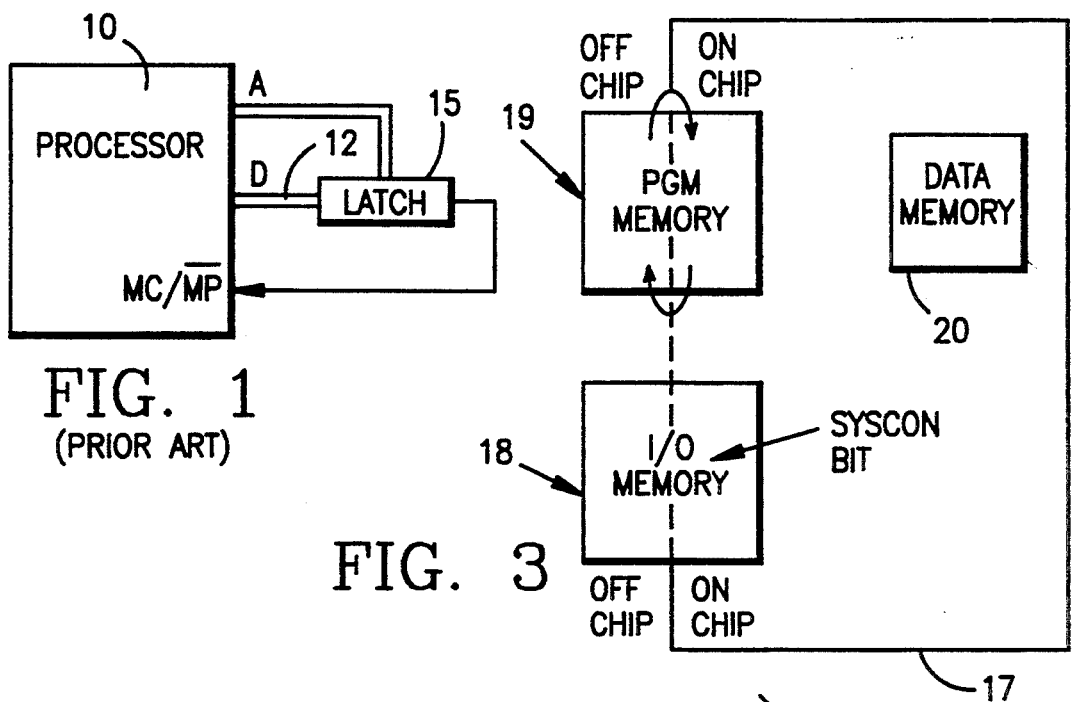
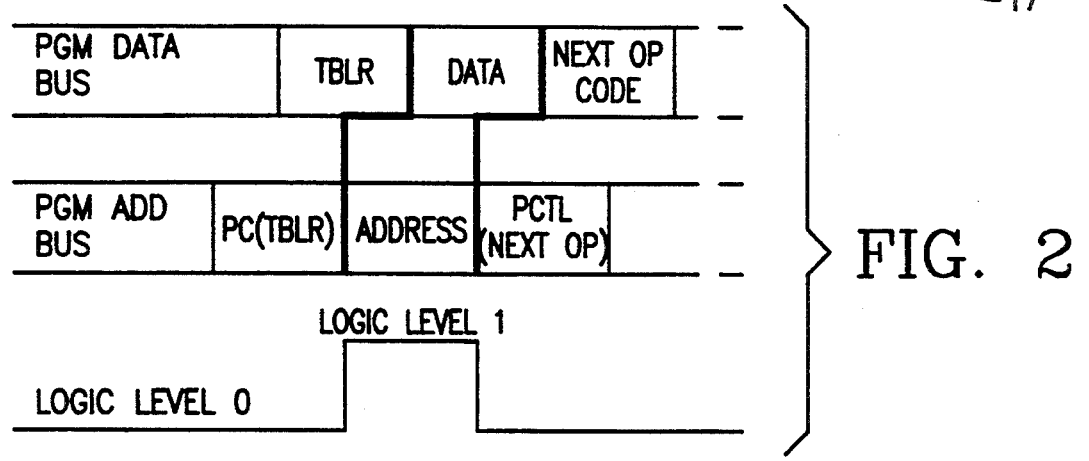
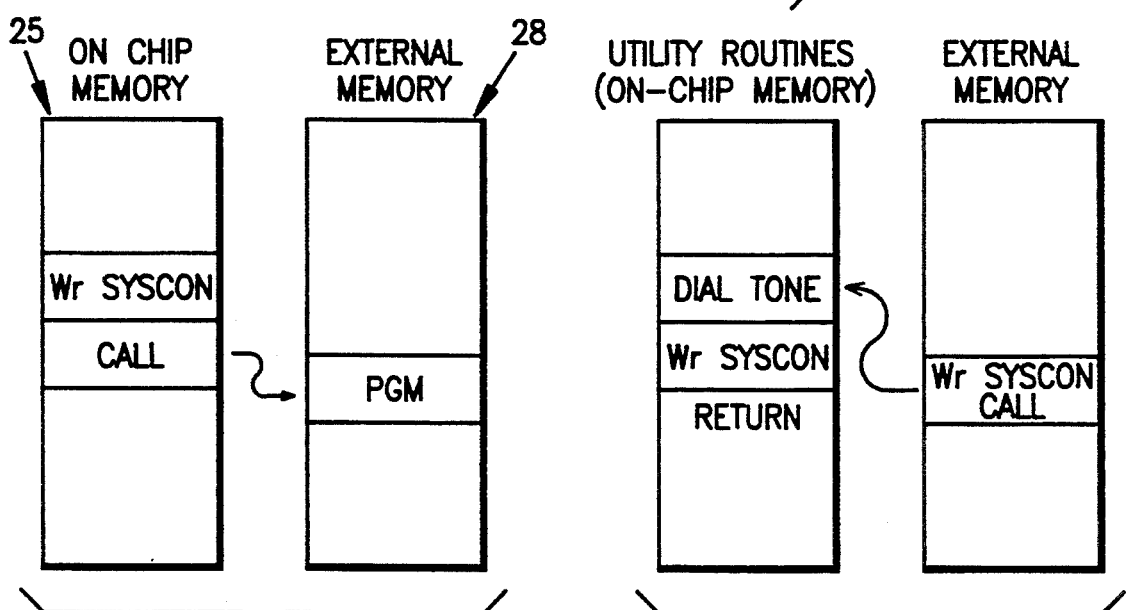

ON-CHIP/OFF-CHIP MEMORY SWITCHING USING SYSTEM CONFIGURATION BIT

CROSS-REFERENCE TO RELATED APPLICATION

This application is a continuation of application Ser. No. 07/454,289, filed Dec. 21, 1989, now abandoned.

BACKGROUND OF THE INVENTION

The present invention relates generally to semiconductor microprocessors and microcontrollers, and more particularly to such devices having on-chip program memory.

In microcontroller or microprocessor devices having on-chip or on-board program memory, it is necessary during the execution of certain programs to switch from the on-chip memory, which may be ROM, EPROM, EEPROM or other program memory, to off-chip program memory, and vice versa. The conventional technique for accomplishing this system configuration is to use a pin on the semiconductor device package, such as a 40-pin or a 68-pin package, to which a "1" or a "0" is written depending on whether the execution is to be from internal or external memory. This pin is customarily referred to in the industry as MC/$\overline{\text{MP}}$ (short for MicroController or MicroProcessor mode), or $\overline{\text{EA}}$ (for External Access).

The prior art technique may be explained by reference to the block diagram of FIG. 1. A microcontroller 10 addresses the data bus 12, latches data sent to a specific address via a latch 15, and brings a bit back on the MC/$\overline{\text{MP}}$ pin. A program executing from internal memory is required to write a "0" to switch to execution from external memory, and a program executing from external memory is required to write a "1" to switch to execution from internal memory. A latch is necessary because the effect must be delayed until the next instruction begins execution. The need for an additional pin to accommodate MC/$\overline{\text{MP}}$ is wasteful in that there is generally a desire to conserve pin outs of the package for various essential purposes.

Accordingly, it is a principal object of the present invention to provide improvements in techniques for switching between internal and external memory in semiconductor microcontrollers and microprocessors.

Another important object of the invention is to provide a semiconductor device requiring program execution from on-chip memory and off-chip memory, in which simplified switching between the two memories is employed for such purpose.

SUMMARY OF THE INVENTION

Briefly, according to the present invention, the switching between internal and external memory during program execution by the microcontroller (or microprocessor) is accomplished by using a system configuration (SYSCON for short) bit which can be written as either a "1" or a "0" depending on whether the on-chip program memory or the off-chip program memory is to be used in executing the program or a part of the program. The effect is tantamount to taking the latch and the MC/$\overline{\text{MP}}$ pin functionality of the prior art implementation and bringing them into the chip. Beyond the saving of a pin in the package into which the device is assembled, the invention also provides the advantage of placing the execution from either memory selectively under the program control.

Therefore, it is still another object of the invention to provide a semiconductor device in which programs are executed using either on-chip program memory or off-chip program memory according to the value written into a system configuration (SYSCON) bit.

BRIEF DESCRIPTION OF THE DRAWINGS

The above and still further objects, features and attendant advantages of the present invention will become apparent to those skilled in the art to which the invention pertains from a consideration of the following detailed description of a presently preferred embodiment thereof, taken in conjunction with the accompanying drawings, in which:

FIG. 1 is a simplified block diagram of the prior art arrangement used for executing internal and external program memories, using an MC/$\overline{\text{MP}}$ or $\overline{\text{EA}}$ pin, as described above;

FIG. 2 is an exemplary three cycle instruction showing bus contents and related items useful for explaining one advantage of the invention;

FIG. 3 is an illustrative embodiment of a single chip processor device having both on-chip and off-chip program memory; and FIG. 4a and FIG. 4b are sequence diagrams useful for describing the technique for writing the SYSCON bit according to the invention.

DETAILED DESCRIPTION OF THE PRESENTLY PREFERRED EMBODIMENT

Referring now to the Figures of drawing, consider the illustrative three cycle instruction depicted in FIG. 2, which is useful to point out a significant difficulty encountered with the prior art MC/$\overline{\text{MP}}$ pin, and to aid the understanding of how the technique of the present invention overcomes it. The instruction presented in FIG. 2 is part of a program utilized in a single silicon chip microcontroller with both on-chip memory and off-chip program memory. For the specific exemplary microcontroller to which this applies, the instruction TBLR (table read) transfers data out of the program memory into the data memory for further data processing. This TBLR instruction is a three cycle instruction. The program data bus is approximately one-half cycle behind the program address bus. In the first cycle, the program address bus has a program count corresponding to the table address. The data returned from the program memory corresponding to this address is the TBLR instruction. In the second cycle, the TBLR instruction seeks data from the program memory and, to that end, the address corresponding to that program memory location is put on the program address bus.

If the device in which this instruction is executed were to use the prior art MC/$\overline{\text{MP}}$ pin, the state of that pin (logic level "0" or logic level "1") during the second cycle will determine whether this address points to an internal program memory or an external memory. The state of the MC/$\overline{\text{MP}}$ pin during the first cycle determines whether the TBLR instruction being executed originated in the internal memory or the external memory. The data is retrieved from the program memory onto the program data bus, and put into the data memory. During that operation, the next instruction is fetched to be executed in the cycle.

The significance of this three cycle instruction, which is presented solely by way of example, is that it is essential for purposes of faithful execution of the program, to know whether a given address is pointing to an internal (on-chip) memory location or an external (off-chip) memory location. In devices that use an MC/$\overline{\text{MP}}$ pin, the pin can be flipped from a "0" to a "1" in mid-stream during the time that the address is pointing to internal memory. This is tantamount to pirating from a program that is resident in the chip. Such piracy is undesirable since considerable effort is necessary in developing the program.

As noted above, the present invention avoids the need to provide a pin-out external to the package for the microcontroller (or any other processor) using both on-chip program memory and off-chip program memory, to switch between the two. According to the invention, a system configuration bit is written to be either "0" or "1" throughout the instruction to be executed. If this SYSCON bit is "0" during the instruction, execution is from the outside program memory, and if it is "1" the execution is from internal memory.

In the illustrative embodiment (FIG. 3) a processor chip or controller chip 17 includes an I/O memory 18, a program memory 19 and a data memory 20. The I/O memory and the program memory are partly on-chip and partly off-chip. In essence, each of these memories has a mirror image on- and off-chip, but, in each case, execution relative to locations in the respective memory may take place either on-chip or off-chip, but not both on-chip and off-chip simultaneously. For the sake of example, the I/O memory has eight locations, the program memory has 4,096 locations, and the data memory has 256 locations. The SYSCON bit resides in the I/O memory in the illustrative embodiment. This is not essential, however, the significant aspect being that the SYSCON bit must be in a memory location that is capable of being shared on-chip and off-chip. Otherwise, once the program sequence were shifted or switched from on-chip memory to off-chip memory, or vice versa, there would be no possibility for return. With the SYSCON bit in I/O memory, any suitable instruction may be used to change its value from logic level "0" to logic level "1" or vice versa, to achieve the desired switch between the on-chip and off-chip memory locations according to the program being executed.

If the SYSCON bit value change were to take effect immediately, the immediately following instruction will be executed from the opposite memory. For example, if the program is being executed on-chip (with the SYSCON bit being a "1"), and the SYSCON bit is then changed to "0", the next instruction executed will be from the external program memory. This immediate change may be undesirable because it involves considerable program segmentation. The effect of the SYSCON bit is therefore delayed for a number of cycles which is appropriate for the particular instruction repertoire of the processor of interest, i.e., for the device being used. In the preferred embodiment of the invention, the SYSCON bit is written to a desired value, and two instruction cycles later, the program is shifted to the memory designated by that value. Further, the bit value is held during the execution of each instruction, which is to be contrasted with the situation that exists with the use of an MC/$\overline{\text{MP}}$ pin, where a memory switch could be made in mid-instruction which inevitably leads to program errors. The only method heretofore used to avoid this undesirable operation has been to place a cautionary warning in the instruction manual or data sheet for the device, that the user should not attempt or allow a switch in logic levels for the MC/$\overline{\text{MC}}$ pin while an instruction is being executed.

Referring now to FIG. 4a, which illustrates two pages, one of which is on-chip memory 25 and the other of which is external program memory 28, the most effective technique for achieving the holding of the SYSCON bit for the two cycles of the instruction is to write the SYSCON bit and execute a branch (program sequence change), or a call, to a specific location in the other program memory. The branch instructions are then executed in two cycles.

In FIG. 4b, utility routines are stored in internal memory 25 and the external program of memory 28 varies from application to application. When the application program desires to perform a task that requires a utility program to cycle inside the on-chip memory 25, it writes the SYSCON bit to "1" and then calls the routine in that memory. The routine performs its task, such as supplying dial tone for a telephone, and, at the end of the routine, writes the SYSCON bit to "0" and does a return to the external program 28. This is the point at which the external program was exited, so the application program may now continue from that point. This is an efficient utilization of the on-chip memory, and provides flexibility for different application programs.

It will be understood from the foregoing specification, then, that the present invention is significant in at least two respects; namely, that switching between on-chip memory and off-chip memory is achieved without need for using a special pin on the device package, and that there is no possibility of such switching occurring in mid-instruction with attendant errors in execution.

Although a presently preferred embodiment of the invention has been described, it will be recognized by those skilled in the field to which the invention pertains from reading the foregoing description, that variations and modifications of the preferred embodiment may be made without departing from the true spirit and scope of the invention. It is therefore desired that the invention shall be limited only as and to the extent required by the appended claims and the rules and principles of applicable law.

What is claimed is:

1. In a semiconductor processor on a chip with on-chip memory housed in a package with pin-outs for access to the semiconductor processor and the on-chip memory, and having accessible off-chip program memory, the improvement comprising:

means for selectively switching between the on-chip memory and the off-chip memory during program execution without employing a pin-out of said package, said switching means including address location means shared by the on-chip memory and the off-chip memory for storage of a system configuration bit having a selectively variable logical value of either "1" or "0" according to whether a program under execution is to be executed from the on-chip memory or the off-chip memory, programming means for inserting an instruction to change the logical value of said system configuration bit at any predetermined point in said program under execution at which the program execution is to be switched from one of the on-chip memory and the off-chip memory to the other, and means for holding said system configuration bit at its value which existed prior to the change in value dictated by said instruction for a predetermined number of instruction cycles following execution of said instruction.

2. The improvement according to claim 1, including:
a single chip microcontroller having said semiconductor processor incorporated therein.

3. A process for executing an instruction set of a program utilizing on-chip program memory and off-chip program memory associated with a single chip semiconductor processor, in which instructions are executed in cycles within a program sequence of an instruction repertoire of the process, said process including:
executing instructions in the program from both on-chip memory and off-chip memory, which requires switching between on-chip memory and off-chip memory during execution of the program,
performing the required switching between the on-chip memory and the off-chip memory during program execution by use of an instruction in the program which writes one digital value of a system configuration bit stored in an address location shared between those memories to switch from said on-chip memory to said off-chip memory and which writes another digital value of said system configuration bit to switch from said off-chip memory to said on-chip memory,
storing said system configuration bit in an address location of one of the on-chip memory and the off-chip memory which is shared by the other of those memories, to permit a return from one memory to the other memory when a shift to said other memory is desired after program execution from said one memory, and
placing instructions which write the system configuration bit to the digital value necessary to effect the desired switch from one memory to the other in appropriate locations within the sequence of the instructions being executed within the program.

4. The process of claim 3, further including:
maintaining the digital value of said system configuration bit which it had prior to an instruction that writes a new digital value of the system configuration bit to effect a switch from one memory to the other, for a predetermined number of instruction cycles after execution of the instruction that writes the new digital value of said system configuration bit.

5. The process of claim 4, further including:
changing to the new digital value of said system configuration bit after maintaining the prior digital value of the bit for said predetermined number of instruction cycles, to switch the program execution from one to the other of the memories, at the commencement of a new instruction cycle.

6. A process for executing an instruction set of a program utilizing on-chip program memory and off-chip program memory associated with a single chip semiconductor processor, in which instructions are executed in cycles within a program sequence of an instruction repertoire of the process, said process including:
executing instructions in the program from both on-chip memory and off-chip memory, which requires switching between on-chip memory and off-chip memory during execution of the program,
performing the required switching between the on-chip memory and the off-chip memory during program execution by use of an instruction in the program which writes one digital value of a system configuration bit stored in an address location shared between those memories to switch from said on-chip memory to said off-chip memory and which writes another digital value of said system configuration bit to switch from said off-chip memory to said on-chip memory, and
placing instructions which write the system configuration bit to the digital value necessary to effect the desired switch from one memory to the other in appropriate locations within the sequence of the instructions being executed within the program,
storing said system configuration bit in an address location of one of the on-chip memory and the off-chip memory which is shared by the other of those memories, to permit a return from one memory to the other memory when a shift to said other memory is desired after program execution from said one memory,
storing a utility routine in one of the memories to perform a predetermined task within an application program by switching from the other memory, from which the program is being executed, to the memory in which the utility routine is stored, and
providing at the conclusion of the utility routine a change in the digital value of the system configuration bit to cause automatic switching of the program execution back to the other memory when the execution of the utility routine has been completed.

7. In a process for executing application programs by a microcontroller system having both internal and external memory and in which the microcontroller system is selectively configured for executing application programs from internal or external memory or both,
storing a bit in an address location shared by both the internal and external memories for changing the configuration of the microcontroller system from execution of an application program from internal memory to execution of the application program from external memory, or vice versa, by changing the logical value of said bit from a "1" to a "0", or vice versa,
executing an instruction to change the logical value of said bit by writing the other value thereof whenever it is desired to switch from execution of the application program from the internal memory to execution of the application program from the external memory, or vice versa, and
suppressing the change in the logical value of said bit until passage of at least one instruction cycle following the execution of the instruction to change the logical value.

8. In a process for executing application programs by a microcontroller system having both internal and external memory and in which the microcontroller system is selectively configured for executing application programs from internal or external memory or both,
storing a bit in an address location shared by both the internal and external memories for changing the configuration of the microcontroller system from execution of an application program from internal memory to execution of the application program from external memory, or vice versa, by changing the logical value of said bit from a "1" to a "0" or vice versa, executing an instruction to change the logical value of said bit by writing the other value thereof whenever it is desired to switch from execution of the application program from the internal memory to execution of the application program from the external memory, or vice versa, storing a utility routine, intended to perform a predetermined task within an application program to be executed, in one of the internal and external memories so that the utility routine may be executed at a desired point in the execution of an application program from the other of the memories by switching to the memory in which the utility routine is stored through an instruction with an appropriate change in the logical value of said bit at said desired point, and before storing the utility routine, programming a change in the logical value of said bit at the conclusion of the utility routine to trigger a return to program execution from the other memory upon completing execution of the utility routine.

9. In a semiconductor processor on a chip with on-chip memory housed in a package with pin-outs for access to the semiconductor processor and the on-chip memory, and having accessible off-chip program memory, the improvement comprising:

means for selectively switching between the on-chip memory and the off-chip memory during program execution without employing a pin-out of said package, said switching means including address location means shared by the on-chip memory and the off-chip memory for storage of a system configuration bit having a selectively variable logical value of either "1" or "0" according to whether a program under execution is to be executed from the on-chip memory or the off-chip memory, programming means for inserting an instruction to change the logical value of said system configuration bit at any predetermined point in said program under execution at which the program execution is to be switched from one of the on-chip memory and the off-chip memory to the other, and means in one of said memories for storing a utility routine intended to perform a predetermined task within said program, said utility routine having programmed therein a change in the logical value of said system configuration bit at the end of the utility routine to switch from the memory in which said storing means is located to the other of said memories for switching further program execution to the other memory following execution of the utility routine.

10. A microcontroller for executing application programs from either or both of internal memory and external memory relative to a semiconductor chip in which the microcontroller and the internal memory are fabricated, comprising:

bit storage means having an address location which is shared by both the internal and external memories for changing a configuration for execution of an application program from internal memory to external memory, or vice versa, by changing the logical value of a bit stored therein from a "1" to a "0", or vice versa, programming means for executing an instruction to change the logical value of said bit whenever it is desired to switch the application program execution from the internal memory to the external memory, or vice versa, and delay means responsive to the instruction to change the logical value for delaying implementation of the changed logical value of said bit until passage of at least one instruction cycle following execution of said instruction.

11. A microcontroller for executing application programs from either or both of internal memory and external memory relative to a semiconductor chip in which the microcontroller and the internal memory are fabricated, comprising:

bit storage means having an address location which is shared by both the internal and external memories for changing a configuration for execution of an application program from internal memory to external memory, or vice versa, by changing the logical value of a bit stored therein from a "1" to a "0", or vice versa, programming means for executing an instruction to change the logical value of said bit whenever it is desired to switch the application program execution from the internal memory to the external memory, or vice versa, and means for maintaining the same logical value of said bit throughout the execution of any given instruction of an application program being executed, whereby to preclude switching between the internal memory and the external memory during execution of said given instruction.

12. A microcontroller for executing application programs from either or both of internal memory and external memory relative to a semiconductor chip in which the microcontroller and the internal memory are fabricated, comprising:

bit storage means having an address location which is shared by both the internal and external memories for changing a configuration for execution of an application program from internal memory to external memory, or vice versa, by changing the logical value of a bit stored therein from a "1" to a "0", or vice versa, programming means for executing an instruction to change the logical value of said bit whenever it is desired to switch the application program execution from the internal memory to the external memory, or vice versa, and routine storage means in one of said internal and external memories storing a utility routine to perform a predetermined task within an application program to be executed, said stored utility routine ending with a change of the logical value of said bit to effect an automatic shift to the other of the memories following execution of the utility routine.

13. In a semiconductor processor on a chip with on-chip memory housed in a package with pin-outs for access to the semiconductor processor and the on-chip memory, and having accessible off-chip program memory, the improvement comprising:

means for selectively switching between the on-chip memory and the off-chip memory during program execution without employing a pin-out of said package, said switching means including address location means shared by the on-chip memory and the off-chip memory for storage of a system configuration bit having a selectively variable logical value of either "1" or "0" according to whether a program under execution is to be executed from the on-chip memory or the off-chip memory, programming means for inserting an instruction to change the logical value of said system configuration bit at any predetermined point in said program under execution at which the program execution is to be switched from one of the on-chip memory and the off-chip memory to the other, and means for holding said system configuration bit at its value which existed prior to the change in value dictated by said instruction for a predetermined number of instruction cycles following execution of said instruction, wherein instructions are executed in said cycles within a program sequence of an instruction repertoire of the semiconductor processor, said number of instruction cycles being set to a number which is not greater than the maximum number of instruction cycles required to perform a change in the program sequence.

14. A process for executing an instruction set of a program utilizing on-chip program memory and off-chip program memory associated with a single chip semiconductor processor, in which instructions are executed in cycles within a program sequence of an instruction repertoire of the process, said process including:

executing instructions in the program from both on-chip memory and off-chip memory, which requires switching between on-chip memory and off-chip memory during execution of the program, performing the required switching between the on-chip memory and the off-chip memory during program execution by use of an instruction in the program which writes one digital value of a system configuration bit stored in an address location shared between those memories to switch from said on-chip memory to said off-chip memory and which writes another digital value of said system configuration bit to switch from said off-chip memory to said on-chip memory, placing instructions which write the system configuration bit to the digital value necessary to effect the desired switch from one memory to the other in appropriate locations within the sequence of the instructions being executed within the program, storing said system configuration bit in an address location of one of the on-chip memory and the off-chip memory which is shared by the other of those memories, to permit a return from one memory to the other memory when a shift to said other memory is desired after program execution from said one memory, and maintaining the digital value of said system configuration bit which it had prior to an instruction that writes a new digital value of the system configuration bit to effect a switch from one memory to the other, for a predetermined number of instruction cycles after execution of the instruction that writes the new digital value of said system configuration bit, selection of said predetermined number of instruction cycles being made according to the number of instruction cycles which are required to perform a change in the program sequence in the instruction repertoire of the process.

15. The process of claim 14, wherein:
said predetermined number of instruction cycles is selected to be two cycles.

16. The process of claim 14, wherein:
maintaining the prior value of the system configuration bit for two instruction cycles following execution of the instruction that wrote a new digital value of the bit, whereby to maintain execution of the program from the on-chip or off-chip memory designated by said prior value of the system configuration bit, is achieved by executing a two cycle branch instruction to call an address location in the other memory.

17. In a process for executing application programs by a microcontroller system having both internal and external memory and in which the microcontroller system is selectively configured for executing application programs from internal or external memory or both, storing a bit in an address location shared by both the internal and external memories for changing the configuration of the microcontroller system from execution of an application program from internal memory to execution of the application program from external memory, or vice versa, by changing the logical value of said bit from a "1" to a "0" or vice versa, executing an instruction to change the logical value of said bit by writing the other value thereof whenever it is desired to switch from execution of the application program from the internal memory to execution of the application program from the external memory, or vice versa, suppressing the change in the logical value of said bit until passage of at least one instruction cycle following the execution of the instruction to change the logical value, and allowing the change in the logical value of said bit to occur at the commencement of the instruction cycle next following said at least one instruction cycle during which the change in the logical value of said bit is suppressed.

18. In a process for executing application programs by a microcontroller system having both internal and external memory and in which the microcontroller system is selectively configured for executing application programs from internal or external memory or both, storing a bit in an address location shared by both the internal and external memories for changing the configuration of the microcontroller system from execution of an application program from internal memory to execution of the application program from external memory, or vice versa, by changing the logical value of said bit from a "1" to a "0" or vice versa, executing an instruction to change the logical value of said bit by writing the other value thereof whenever it is desired to switch from execution of the application program from the internal memory to execution of the application program from the external memory, or vice versa, and changing the logical value of said bit in accordance with an instruction to change the logical value thereof, only at the commencement of an instruction cycle following the instruction cycle in which the instruction to change is executed.

* * * * *